E. WIRTH-FREY.
HEAT INTERCHANGE DEVICE.
APPLICATION FILED NOV. 1, 1919.
1,393,475.   Patented Oct. 11, 1921.
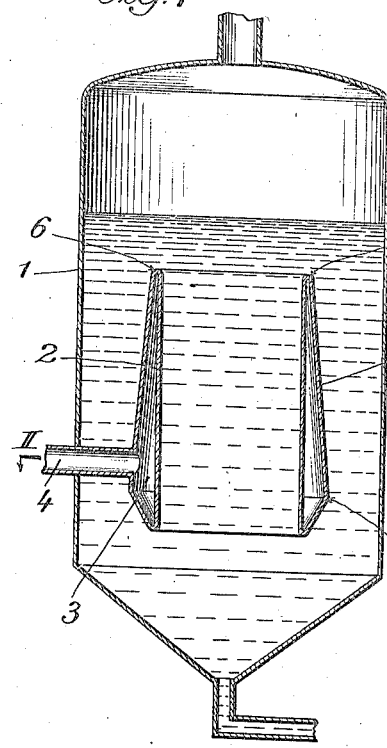
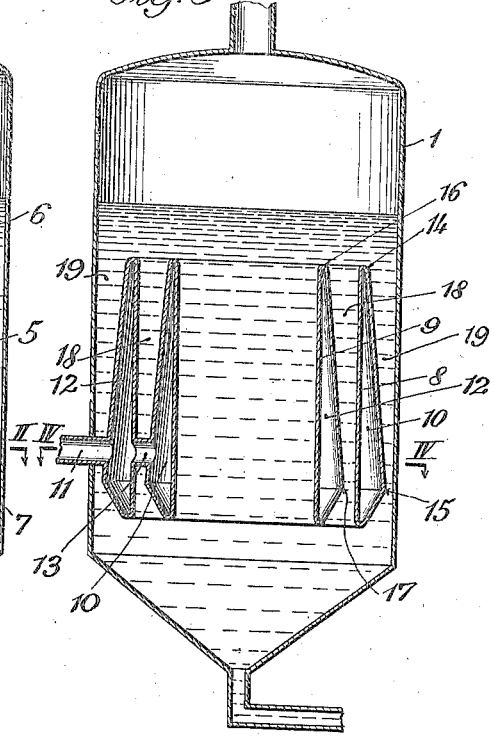
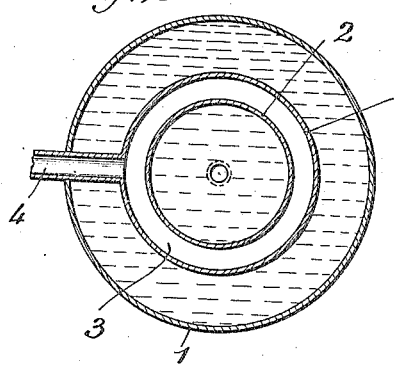
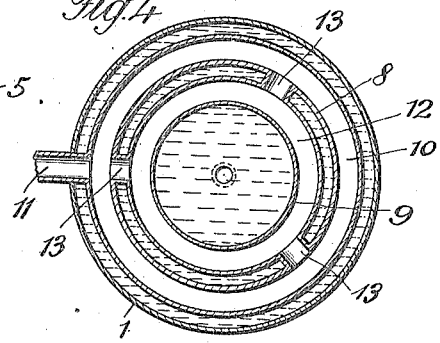
Inventor:
Elias Wirth-Frey,
By Henry Ortly
Atty.

UNITED STATES PATENT OFFICE.

ELIAS WIRTH-FREY, OF AARAU, LAURENZVORSTADT, SWITZERLAND.

HEAT-INTERCHANGE DEVICE.

1,393,475.  Specification of Letters Patent.  Patented Oct. 11, 1921.

Application filed November 1, 1919. Serial No. 335,027.

*To all whom it may concern:*

Be it known that I, ELIAS WIRTH-FREY, a citizen of the Republic of Switzerland, residing at Aarau, Laurenzvorstadt, Switzerland, have invented certain new and useful Improvements in Heat-Interchange Devices; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in heat interchange devices and particularly to heating bodies adapted to be used in connection with evaporating devices for liquids.

The heating bodies hitherto proposed adapted to be arranged within evaporating devices and provided with vertical channels for the passage of the liquid to be evaporated, present the drawback that their channels have over the whole length the same cross-section, no consideration being given to the fact that the volume of the steam produced in the liquid to be evaporated increases toward the level of the liquid owing to the fact that the produced steam bubbles rise in the liquid and that the lower ones combine with the upper ones. When, therefore, the area of passage for the liquid is not greater at the top than at the bottom of the device, the regular and proper working of such evaporating devices is easily disturbed and the generation of steam is influenced in a detrimental manner from the economical point of view.

The object of this invention is to eliminate the drawback referred to. To this end the heating bodies are so designed that the area of passage for the liquid to be evaporated increases toward the upper end of the heat interchange device.

The invention will now be more particularly described with reference to the accompanying drawing illustrating by way of example two modes of carrying out the invention. In this drawing:

Figure 1 is a vertical section through the first embodiment.

Fig. 2 is a horizontal section on the line II—II of Fig. 1.

Fig. 3 is a vertical section through the second embodiment and Fig. 4 is a horizontal section on the line IV—IV of Fig. 3.

Referring at first to Figs. 1 and 2 of the drawing, 1 designates a cylindrical evaporating vessel. Within this vessel 1 is arranged vertically a hollow annular body 2 circular in cross-section. The hollow space 3 of this body 2 communicates with a pipe 4 adapted to supply to said space 3 steam for heating the liquid contained in the vessel 1. The outer wall 5 of the annular, hollow heating body 2 tapers in a plane passing through its axis upward from the rim 7 up to the rim 6. Consequently the hollow space confined between said portion of the outer wall 5 of the heating body 2 and the evaporating vessel 2 is flaring upward. Owing to this form of the annular channel provided for the passage of the liquid to be evaporated, due consideration is given to the fact that the number of bubbles of steam rising in the liquid contained in the vessel 1 increases toward the liquid level, *i. e.* to the circumstance that the steam volume is considerably greater in the upper layers of the liquid to be evaporated than in the lower ones. As the bubbles of steam rise vertically within the liquid, they do not impinge in the hereinbefore described device against steam bubbles contained in higher layers; on the contrary, they pass only through particles of liquid which do not contain any such bubbles. As a result of this, a more rapid and regular heating of the liquid is obtained.

Instead of arranging only one heating body 2 within the cylindrical evaporating vessel 1, also more than one such body can be provided. In the embodiment illustrated in Figs. 3 and 4 two annular, hollow heating bodies 8 and 9 are arranged vertically within the evaporating vessel 1, the body 9 being arranged concentrically within the hollow body 8. The hollow space 10 of the heating body 8 communicates with a pipe 11 for supplying heating steam to said space 10. The latter communicates in its turn with the hollow space 12 of the outer heating body 8 by means of three connecting branches 13. The outer wall of the outer heating body 8 tapers in a plane passing through the axis of this body upward from the rim 15 up to the rim 14 and the outer wall of the inner heating body 9 from the rim 17 up to the rim 16. Consequently, the annular channel confined between said portion of the outer wall of the body 9 and the inner wall of the body 8 and the annular channel confined between the portion of the outer wall of the body 8 lying between the rims 14 and 15 and the inner wall of the vessel 1 flare upwardly. As a result of this, the above mentioned advantages obtained in connection with the first mentioned construction are also obtained,—and even to a greater degree—in a device of the type illustrated in Figs. 3 and 4.

I claim:

1. A heat interchange device having a vertical axis comprising a vessel, a hollow annular body narrower in cross section at the top than at the bottom to form a chamber for heating medium gradually narrowing substantially throughout its length toward the top, and means to supply heating medium within said body at the bottom thereof.

2. A heat interchange device having a vertical axis comprising a vessel, a hollow annular heating body within said vessel having a conical wall and a cylindrical wall and narrower in cross-section at the top than at the bottom, and means to supply heating medium within said body near the bottom of said conical wall.

3. A heat interchange device having a vertical axis comprising concentric interconnected annular bodies, each having an inner cylindrical wall and an outer conical wall interconnected at their lower ends, thereby forming chambers for heating medium gradually tapering toward their upper ends.

In testimony that I claim the foregoing as my invention, I have signed my name.

ELIAS WIRTH-FREY.

Witness:
ARNOLD LEHNER.